Feb. 9, 1937. J. W. MORSE ET AL 2,070,022
AUTOMOBILE BRAKE TESTER
Filed April 7, 1930 3 Sheets-Sheet 1
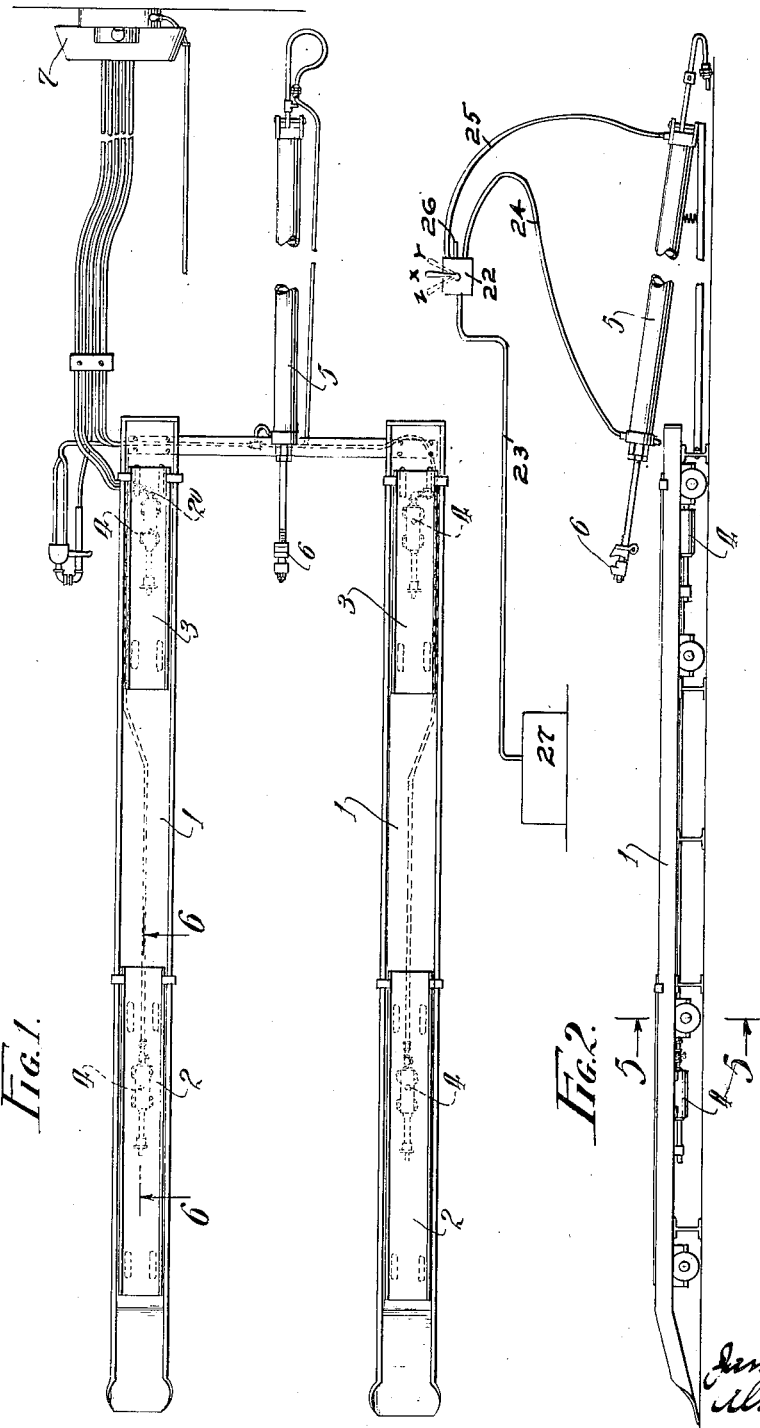

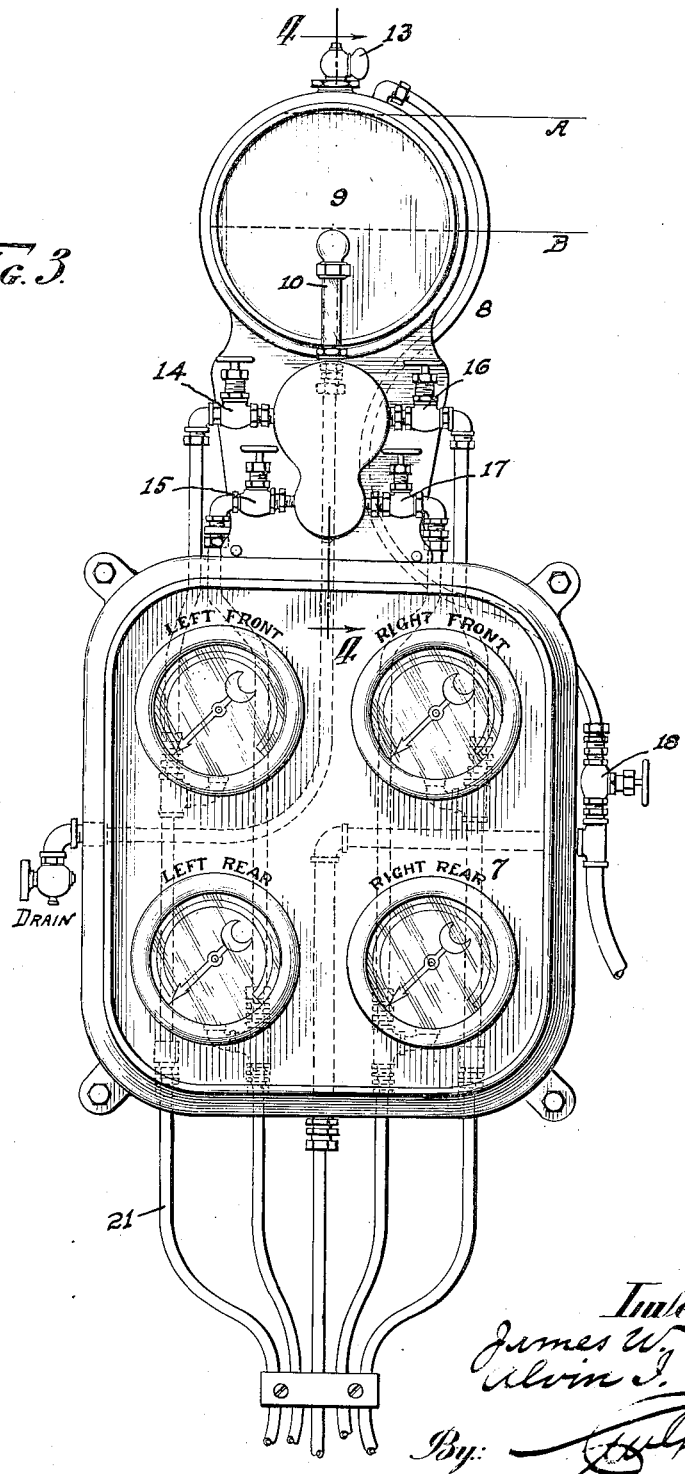

Feb. 9, 1937.  J. W. MORSE ET AL  2,070,022
AUTOMOBILE BRAKE TESTER
Filed April 7, 1930   3 Sheets-Sheet 3
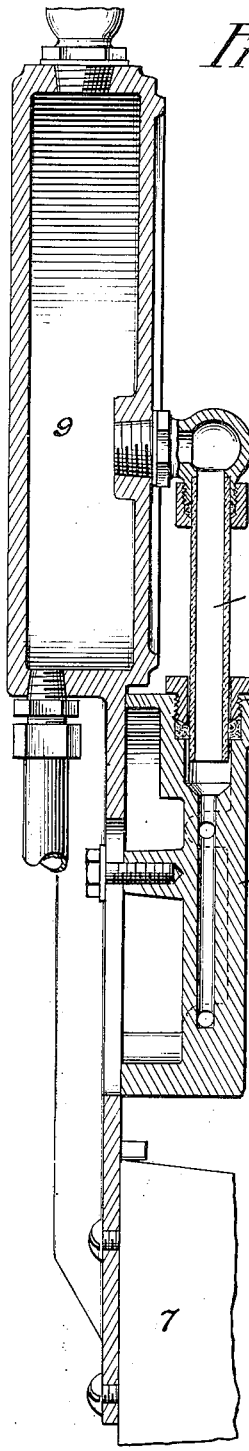
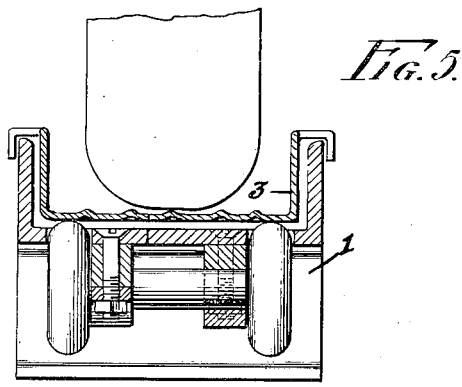
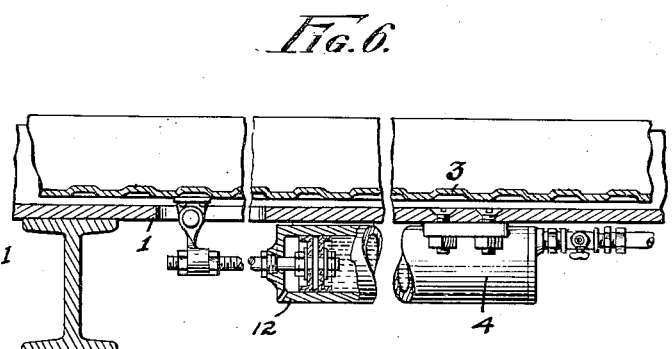
Inventor:
James W. Morse
Alvin J. Moore
By
Graham
Atty.

Patented Feb. 9, 1937

2,070,022

UNITED STATES PATENT OFFICE 2,070,022

AUTOMOBILE BRAKE TESTER

James W. Morse and Alvin I. Moore, Lansing, Mich., assignors to Food Machinery Corporation, San Jose, Calif.

Application April 7, 1930, Serial No. 442,254

14 Claims. (Cl. 265—47)

This invention relates to an apparatus for giving a static friction test to the brakes of automobiles through the means of hydraulically operated devices, and to give instant and simultaneous visual evidence on properly adjusted indicating devices the actual condition of the braking efficiency of an automobile.

Brakes that are too tight or unevenly adjusted cause the car to skid and at times create a hazard to driving that would not be present with properly adjusted brakes.

When the brakes are applied to a car in motion the inertia of the car tends to pull the car forward bodily and drag the tires along the road surface. The object of best braking efficiency is to develop the highest tractional resistance between the road surface and the tires, and yet not permit the tires to skid. The highest point of braking efficiency, regardless of the speed or weight of the car, is obtained just prior to the point of skidding. The purpose of all brake testing is to determine when this condition is reached and not passed. This is exactly what this invention is adapted to do and which makes it a highly efficient and accurate device for the purpose.

Broadly considered the apparatus comprises a platform onto which the car is driven and when properly positioned for testing the brakes the wheels rest on movable, hydraulically controlled cradles forming a part of the platform construction. The hydraulically controlled cradles connect with suitable visual gauges that indicate to the testing operator the braking efficiency of the several brakes on the car. After the car is positioned a pull bar is snapped onto the front axle to provide the necessary means to pull the car forward against the resistance of the brakes, and through the indicating devices give a visual evidence of the condition of the several braking devices.

In the operation of hydraulic devices it is highly essential that no air is entrapped anywhere along the piping or apparatus comprising the testing devices or the readings will be inaccurate and will not indicate the true condition of the devices being tested or enable the operator to adjust the devices to give an accurate record. The removal of any entrapped air and means for determining with accuracy when this is accomplished is an important feature of this invention, and to give it proper identity may be termed "a stabilizing system", because through its operation the attendant is enabled to test and stabilize the testing gauges at any time to determine with accuracy if the combined apparatus will give an accurate and correct indication of the condition of the brakes on any car.

Up to the time of this invention there has been no device known to us that may be stabilized for accurately and simultaneously testing all of the brakes on an automobile and giving a visual reading on suitable indicating devices whereby both the operator and the owner or driver could be instantly advised whether the brakes were all properly adjusted and the necessary steps to take to bring them into adjustment if they were deficient in any manner.

It is therefore a principal object of the invention to provide a device for automatically testing the braking condition of an automobile and at the same time give visual evidence of the condition of the brakes and indicate the necessary adjustments to bring the brakes into proper adjustment if they are not in such condition.

A further object of the invention resides in providing means for stabilizing a hydraulic system as applied to the testing of the brakes of automobiles.

A further object of the invention resides in providing visual means for determining when the hydraulic system is in proper working order.

Another object of the invention resides in providing means for forcibly causing a circulation of the hydraulic medium throughout the system to thereby detect and remove any entrapped air.

A further object of the invention resides in providing means whereby an operator may apply manual means for testing the condition of the said hydraulic system.

A further object of the invention resides in providing means for testing each gauge or indicating device of an installation with air under pressure to ascertain if its reading is correct and in accordance with the readings of the other gauges or indicating devices.

It is therefore a principal object of the invention a system of testing hydraulically operated systems of any description to ascertain if air is entrapped therein and to provide means for removing it and give visual evidence of such removal.

With such objects in view as well as other advantages inherent in the invention, the novel structural peculiarities, novel organization of elements, and the separate and collective operations involved in carrying out the recited objects of the invention, which will be made the subject matter of claims hereto appended, we wish it understood that the several necessary elements and combinations constituting the same may be varied in their proportions, placement and general arrangement and operative relation without departing from the scope and nature of the invention.

In carrying out the objects of the invention in a concrete form or machine, further objects, advantages and improvements have been evolved than have been recited, and in order to make the invention more clearly understood there are shown in the accompanying drawings means and mechanism embodying a preferred structural arrangement and disposition of the different parts and combinations, in which we have simply illustrated one way of embodying the creative part or concept of the invention. The described devices are simply embodiments of the invention which other structures might also employ and some of the parts and combinations may be used without the others in different types of such apparatus without departure from the purview of our invention and we therefore regard ourselves as entitled to such variations from the shown and described devices as fall within the scope and meaning of the claims hereto appended.

Before proceeding with a more detailed description of the invention we wish to state that the several views constituting the drawings herewith were selected and portrayed in a manner that was thought would best illustrate the invention without confining the showing to an exact scale or dimension.

The operative features may be more or less diagrammatic; some parts may be more or less out of relative proportion, and the engineering features of construction may be somewhat at variance with the best or preferred practices in apparatus of this type. With this understanding of the drawings we may now proceed with a description of the invention as illustrated.

Figure 1 is a general plan of the apparatus showing the platform onto which the automobile is driven; the location of the testing cradles on which the wheels rest; the general arrangement of the hydraulic piping and the location of the air controlled pull bar for giving forward impetus to the car during the testing of the brakes.

Figure 2 is a side elevation of Figure 1 showing the parts in substantially the same relative positions, but in this view the gauge panel has been omitted. This view also shows very clearly the hand control valve that is attached by means of flexible tubing so it may be carried into the front seat with the driver or operator who is testing the brakes.

Figure 3 is an enlarged front elevation of the gauge panel with the stabilizing devices attached and in proper operative relation thereto.

Figure 4 is a vertical sectional elevation of the stabilizing device attached to the gauge panel and is taken on approximately the line 4—4 of Figure 3.

Figure 5 is a cross section of one of the cradles carried by the platform and is taken on approximately the line 5—5 of Figure 2.

Figure 6 is a longitudinal section of one of the cradles carried by the platform and has been taken on approximately the line 6—6 of Figure 1.

The numeral 1 represents the side rails of the platform onto which the automobile is driven. 2 represents the cradles on which the rear wheels rest while 3 represents the cradles on which the front wheels rest and 4 may represent the several hydraulic cylinders mounted under the cradles. 5 is the air controlled pull bar device having an attaching member 6 for engagement with the front axle of the automobile, while 7 represents the panel board for the gauge assembly.

By reference to Figure 3 it will be seen that there is a separate pressure gauge for each wheel of the car, connected with suitable piping to each of the hydraulic cylinders 4.

Mounted on top of the gauge panel 7 is placed the stabilizing device represented as a whole by the numeral 8. This device comprises a small oil tank 9 a gauge glass 10 and the cluster block 11 to which the several oil lines lead and which are used for stabilizing the oil supply to the various sections of the system.

The above description gives a general outline of the arrangement of the apparatus, following now with an operative description will, it is thought, give a better understanding of the importance of the invention and its operation.

Since the first thing to do with an apparatus of this type is to ascertain if it is in proper operative adjustment it will be necessary to follow the operation of stabilizing the hydraulic devices so that we can then test the brakes of an automobile and be certain that the indicated results we get are accurate.

The first operation after getting the apparatus installed is to fill the system with oil. The hydraulic cylinders are filled with the proper oil when shipped so that it is only necessary to fill the rest of the system before the operation of stabilization begins.

Filling the system with oil or other proper medium is accomplished in the following manner.

Remove the plug 13 Figure 3 and fill the stabilizer tank 9 with the proper medium to the high oil level A. Now remove plug 20 which will be found just in front of the left front hydraulic cylinder 4 in Figure 1. Close valves 15, 16, 17 and 18, Figure 3 and open valve 14. Push left front cradle forward until all air is removed from the hydraulic cylinder and only oil flows from the opening 20. Now apply air pressure to the top of the oil in the stabilizer tank 9 by opening the valve 18, which is an air line coming from a suitable source of air supply not shown. This air pressure on the top of the oil in the tank 9 will cause oil to flow through the oil line 21, first passing through the valve 14 which has been previously opened. This oil will reach the left front hydraulic cylinder 4 and flow freely through the opening 20. As soon as the air is driven out of this line replace the plug 20 and screw it tight so there will be no leakage, first, however, closing valves 14 and 18. After the plug 20 is securely placed, again open valves 14 and 18 which will admit air to the top of the oil in the tank 9, and open the oil line to the left front hydraulic cylinder, the air pressure will push the plunger 12 and cradle 4 back against a stop. Now close valve 18 and open relief valve 13 on the top of the tank 9, leaving valve 14 open. Now push the left front cradle forward to force the oil back into the tank 9 and watch for air bubbles in the column of oil as it passes through the gauge glass 10 which gives visual evidence of any air bubbles in the oil. If air bubbles are still present the foregoing operations must be repeated until the oil flowing through the gauge glass is free of air when that line is ready for accurate work as far as the oil column is concerned.

The proper setting of the gauge for this line is next attended to. Open valves 14 and 18 which will permit the air flowing through 18 to force oil from the small tank 9 into the left front cylinder 4 until the cradle connected thereto rests against a stop. Closing valve 18 now leaves a hydrostatic pressure on the line and may show a pressure on the gauge for that line, but by opening relief valve 13 this pressure will be released and if the gauge is functioning properly the indicating needle should go to zero when the line is ready for operation. The same precedure must be followed for the remaining lines to clear them of entrapped air and the gauges set to zero when the entire device is ready for operation.

At frequent intervals the gauges should be tested together to ascertain if they all register alike under the same pressure. This is done in the following manner:

First see that the oil level is not too much below the low oil level line B, otherwise air instead of oil will be forced in the system and when air bubbles appear in the gauge glass it is visual evidence that the oil level is too low. Close valve 13 and open valves 14, 15, 16, 17, and 18. This will admit air to the top of the oil in the tank 9 and place a uniform pressure on each of the gauges at the same time. If now they all give the same reading it indicates that they are all accurate, while if one or more show a different reading they must be corrected until all read the same.

Now that the system is properly filled with oil and the entrapped air removed and the gauges all tested to show accurate and the same reading we are ready to test the brakes of an automobile.

To test the brakes of an automobile it is driven onto the platform with the four wheels resting fairly on the four cradles, when the brakes are set with a moderate pressure, the operator taking the switch block 22 into the car with him. After the brakes are set the pull bar with attachment 6 is secured to the front axle when conditions are ready to test the brakes. We will suppose this car is equipped with four wheel brakes. The pull bar 6 is controlled by means of a piston moving in the air cylinder 5 and controlled by the switch block 22. When the handle on the switch block 22 is in position X the air is completely shut off from the cylinder 5. Air under proper pressure is supplied from a suitable source of supply 27 through the flexible pipe 23 passing to the switch block 22. The flexible pipes 24 and 25 leading to the back and front ends of the air cylinder 5, and the port 26 acting as an exhaust for either end of the cylinder 5. With the brakes of the car set and the pull bar 6 attached to the front axle of the car air is admitted to the front end of the cylinder 5 through the pipe 24 when the switch handle is moved to position Y, which will cause the piston to move back into the cylinder and exert a pull on the automobile tending to slide the locked wheels along the top surfaces of the cradles on which they are resting and on which they will slip if the brakes are tight enough and the pull on the pull bar sufficient. It is not desired, however, to slip the wheels along the cradle surfaces. If the brakes happen to be properly adjusted the wheels will resist turning through the braking action of the brake bands and will exert a certain pull on the cradles creating a pressure in the oil lines leading from the four cradles to their companion gauges, which in turn will show a pressure indication on the gauges which will read substantially alike on all gauges. If, however, the brakes are not all properly adjusted and, say, two of the wheels turn under the pulling action of the pull bar the gauges for those wheels will show a reduced pressure or may be no pressure at all, indicating quickly and accurately that these brakes need adjustment. The turning of the wheels on the cradles exerts no pull on the cradles therefore no pressure is generated in those lines, or very little pressure if the brakes are only slightly out of adjustment.

When this condition is present the brakes indicating a low pressure must be adjusted to give the same indication on the gauges as those in proper adjustment.

Maximum stopping power of the car is always reached regardless of the speed of the car when the wheels are retarded by the brakes up to the point just before the tires start to skid. This of course varies with the weight of the car, conditions of the road etc., this device is adapted to cover these requirements so that when the brakes of a car being tested will hold against the pull of the testing machine with a moderate pedal pressure, maximum stopping power is assured, providing of course, the brakes have been properly equalized.

Under ordinary conditions a reading of 2 to 6 on the gauges depending upon the condition of the brake lining and weight of car is ample to give the braking efficiency desired. The pedal pressure should be moderate and a slight amount of pedal travel should still remain, for when operating most cars in wet weather a certain amount of pedal travel is lost.

Referring back to Figure 2 for a moment a further description of the movement of the air control will be given.

When the air handle on the switch block 22 is moved to position Y as mentioned air flows from the supply 27 through the switch block and through pipe 24 into the front end of the cylinder to exert a forward pull on the bar attached to the front axle of the car. As the piston in the cylinder 5 moves back air on the opposite side of the piston is displaced through the pipe 25 and exhaust 26. If it is desired to move the piston in the cylinder 5 in the opposite direction to facilitate attachment to the front axle of the car the switch handle is placed in the position Z when the air will flow through pipe 25 into the cylinder 5 and the displacement air from the other end of the cylinder will escape through pipe 24 and exhaust 26.

The ports in the switch block have not been shown because this valve arrangement is of a well known type in the mechanic arts.

Brakes adjusted by this device will be found far better in efficiency than any legal requirements of the various States. As a matter of information the legal requirements in force in various States for the stopping action of brakes on automobiles may be summarized about as follows:

| Driving speed | 2 wheel brakes should stop | 4 wheel brakes should stop |
| --- | --- | --- |
| 15 miles per hour | 20.8 feet | 12.5 feet. |
| 25 miles per hour | 58.0 feet | 34.7 feet |
| 35 miles per hour | 113.0 feet | 68.2 feet. |
| 45 miles per hour | 188.0 feet | 112.8 feet. |
| 50 miles per hour | 232.0 feet | 139.0 feet. |

What we claim and desire to secure by Letters Patent is:

1. An apparatus for use with automobile brake testing devices comprising a series of fluid responsive pressure indicating devices, a series of wheel supports and hydraulic means connecting said wheel supports and said indicating devices so that movement of said wheel supports will be registered on said indicating devices, means for testing the operation of said indicating devices comprising a source of pressure and means for transmitting said pressure to said indicating devices.

2. An apparatus for testing the braking effort of automobile wheels comprising separate movable supports for each wheel, separate indicating devices for each wheel, a separate hydraulic operating circuit connecting each wheel support with an indicating device, each indicating device being energized through movement of its wheel support with the wheels resting thereon, means for moving the automobile from rest with the brakes set to produce a tractional effort between each wheel and its support which effort will be shown on each indicating device according to the binding effort of each set brake, an auxiliary hydraulic circuit, means normally disconnecting said auxiliary circuit from said operating hydraulic circuits but connectable to each circuit at will for directing the hydraulic fluid of said operating circuit through said auxiliary circuit to ascertain if air is entrapped therein.

3. An apparatus for testing the braking effort of automobile wheels comprising separate movable supports for each wheel, separate indicating devices for each wheel, a separate hydraulic operating circuit for each wheel support and an indicating device, each indicating device being energized through movement of its wheel support with the wheels resting thereon, means for moving the automobile from rest with the brakes set to produce a tractional effort between each wheel support and wheel which will be shown on each indicating device according to the binding effort of each set brake, an auxiliary hydraulic circuit, an auxiliary supply of hydraulic fluid, means for separately directing at will the fluid of each operating hydraulic circuit through said auxiliary circuit in order to find and release entrapped air therein.

4. An apparatus for testing the braking effort of automobile wheels comprising separate movable supports for each wheel, separate indicating devices for each wheel, a separate hydraulic operating circuit for each wheel support and an indicating device, means for moving an automobile from rest with the brakes set and resting on the supports to produce a tractional effort between each wheel support and wheel which will be shown on each indicating device according to the binding effort of each set brake, an auxiliary hydraulic circuit, an auxiliary supply of hydraulic fluid, means in said auxiliary circuit to give visual evidence of the flow of fluid therethrough, means for forcing the fluid from said operating circuit through said auxiliary circuit and through said visual means to detect air entrapped therein.

5. An apparatus for testing the braking effort of automobile wheels comprising separate movable supports for each wheel, separate indicating devices for each wheel, separate hydraulic operating circuits for each indicating device and its wheel support, means for moving an automobile from rest with the brakes set and resting on the supports to produce a tractional effort between each wheel and its support which will be shown on each indicating device according to the binding effort of each set brake, an auxiliary hydraulic stabilizing and testing circuit for checking at will if air is entrapped in the operating circuit, comprising a supply of hydraulic fluid normally out of contact with the operating circuit, means for shunting the operating hydraulic fluid from its circuit into said auxiliary circuit, means along said circuit for visually indicating the flow of said fluid therethrough to detect the presence of entrapped air and means along said operating circuit for removing said entrapped air.

6. An apparatus for testing the braking effort of automobile wheels comprising movable supports for the wheels, indicating devices for each wheel, a hydraulic operating circuit for each wheel support and its indicating device, means for moving an automobile from rest with the brakes set and the wheels resting on the supports to produce a tractional effort between each wheel and its support which effort will be shown on each indicator according to the binding effort of each set brake, an auxiliary hydraulic circuit for stabilizing and correcting the operating hydraulic circuit, means for normally holding said auxiliary circuit out of contact with said operating circuit, means for passing fluid from the operating circuit through said auxiliary circuit at will, means along the flow of said auxiliary circuit for detecting the flow of liquid therethrough and for detecting the presence of entrapped air therein, means along said operating circuit for removing said entrapped air if any.

7. An apparatus for testing the braking effort of automobile wheels comprising movable supports for the wheels, indicating devices for each wheel, a hydraulic operating circuit for each wheel support and its indicating device, means for moving an automobile from rest with the brakes set and the wheels resting on the supports to produce a tractional effort between each wheel and its support which effort will be shown on each indicating device according to the binding effort of each set brake, an auxiliary hydraulic circuit for stabilizing and correcting the efficiency of the operating circuit, manually operated valve means for normally confining the operating circuit to its normal path but opening at will to divert the flow of the operating circuit through said auxiliary circuit to detect the presence of air therein, a transparent wall along said auxiliary circuit to give visual evidence of entrapped air in said operating circuit, with means along said circuits for removing said entrapped air.

8. An apparatus for testing the braking effort of automobile wheels comprising movable supports for the wheels, indicating devices for each wheel, a fluid operating circuit connecting each wheel support and indicating device, means for moving an automobile from rest with the brakes set and the wheels on said supports to produce a tractional effort between each wheel and its support which effort will be shown on each indicating device according to the binding effort of each set brake, an auxiliary fluid circuit for stabilizing and individually correcting the operative condition of the said fluid operating circuits, an auxiliary supply of fluid, means normally maintaining said operating fluid circuits in their normal operative channels but changeable at will to individually direct said operating fluid circuits into said auxiliary circuit for inspection and determination for the presence of air with means along said circuits for removing said air from the fluid stream.

9. A stabilizing system for use in combination with a hydraulic brake testing apparatus an auxiliary tank for holding a supply of hydraulic fluid, means connecting said supply tank with said hydraulic apparatus at will, means for producing a pressure to the supply of fluid in said tank to force the fluid therein into and through said hydraulic apparatus, means along the path of flow through said apparatus to remove air therefrom, means as a part of said stabilizing system for visually inspecting said stream flow to detect the presence of air therein when reversing the path of flow of fluid through said stabilizing system during the said visual inspection.

10. An auxiliary system for checking the operation of a hydraulic brake testing device comprising a shunt line through which the hydraulic fluid may be passed at will from its normal path of flow through the testing device, an auxiliary supply of fluid, means for connecting the said auxiliary supply with the main supply of testing fluid, means for producing a pressure on said auxiliary supply to cause a flow of fluid from said supply through said testing device to expel entrapped air therefrom, means for releasing said entrapped air, visual means along said shunt line for inspecting the fluid flow to determine the presence of air therein when the direction of flow has been reversed.

11. A hydraulic brake testing device comprising movable wheel supports, hydraulic means operatively connected with said wheel supports, individual indicating devices in sealed connection with the hydraulic means of each wheel support so that when said wheel supports are moved to cause a flow of hydraulic fluid toward said indicating devices a pressure will be indicated thereon, an operation checking device connectible at will to said hydraulic means for the detection of air therein, comprising an auxiliary supply of hydraulic fluid, means for producing a pressure on said auxiliary fluid supply to cause a flow of hydraulic fluid away from said indicating devices and through the hydraulic means connected to each wheel support, a bleeder valve along said line of flow for the escape of hydraulic fluid and entrapped air, means for releasing the pressure on said auxiliary fluid supply so the fluid in the hydraulic means may be flowed back into the said auxiliary supply and means along said line of flow for visually inspecting the flow to detect the presence of air therein.

12. A hydraulic automobile brake testing device including hydraulic means operable through moving an automobile from rest with the brakes set, indicating devices in sealed connection with said hydraulic means, an auxiliary hydraulic fluid supply connectible at will to said hydraulic means, means for making said connection, means for producing a hydrostatic pressure on said auxiliary fluid supply and said indicating devices when connected to ascertain if said indicating devices all register the same pressure, then releasing the pressure to permit the indicating devices to return to zero and disconnecting said auxiliary fluid supply.

13. An apparatus for use with automobile brake testing devices comprising a series of indicating devices, wheel supports, and means connecting said indicating devices with said wheel supports so that movement of said wheel supports will be indicated on said indicating devices, a panel for supporting said indicating devices, an auxiliary supply of hydraulic fluid and means for distributing said fluid to said indicating devices and said wheel support devices at will, means for producing a pressure on said auxiliary supply of fluid to cause a flow to said wheel supporting devices and said indicating devices and to cause said indicating devices to show a reading of pressure, means for then to release the pressure on said indicating devices to permit said indicating devices to return to zero thus giving a test of the uniform operation of said indicating devices.

14. An apparatus for use with automobile brake testing devices comprising a series of pressure indicating devices, a series of wheel supports and hydraulic means connecting said wheel supports and said indicating devices so that movement of said wheel supports will be indicated on said indicating devices, means for testing the operation of said indicating devices comprising a pressure chamber and means for producing a pressure therein, means for transmitting said pressure to said indicating devices to ascertain if each indicates the same pressure and means for then releasing said pressure to ascertain if each indicating device will return to zero.

JAMES W. MORSE.
ALVIN I. MOORE.